United States Patent [19]
Stockhausen et al.

[11] Patent Number: 5,592,916
[45] Date of Patent: Jan. 14, 1997

[54] INTERNAL COMBUSTION ENGINE HAVING INTAKE PORT THROTTLES INCORPORATING CHARGE MOTION CONTROL

[75] Inventors: William F. Stockhausen; Robert A. Stein, both of Northville, Mich.

[73] Assignee: Ford Motor Company, Dearborn, Mich.

[21] Appl. No.: 552,447

[22] Filed: Nov. 3, 1995

[51] Int. Cl.[6] .................... F02B 31/00; F02D 9/14
[52] U.S. Cl. ................. 123/308; 123/306; 123/337
[58] Field of Search ........................ 123/306, 308, 123/337, 403, 405, 432, 442

[56] References Cited

U.S. PATENT DOCUMENTS

| | | | |
|---|---|---|---|
| 4,207,854 | 6/1980 | Alford et al. | 123/188.14 |
| 4,228,772 | 10/1980 | Bakonyi | 123/403 |
| 4,358,414 | 11/1982 | Webster et al. | 261/53 |
| 4,428,334 | 1/1984 | Klomp | 123/306 X |
| 4,651,693 | 3/1987 | Nakajima et al. | 123/306 |
| 4,805,569 | 2/1989 | Suzumura et al. | 123/308 |
| 5,186,140 | 2/1993 | Ueda et al. | 123/308 |
| 5,454,357 | 10/1995 | Elder | 123/432 |

FOREIGN PATENT DOCUMENTS

| | | |
|---|---|---|
| 4109418 | 9/1992 | Germany. |
| 4-183941 | 6/1992 | Japan. |

*Primary Examiner*—Tony M. Argenbright
*Attorney, Agent, or Firm*—Jerome R. Drouillard

[57] ABSTRACT

A multicylinder internal combustion engine has an intake port for each cylinder, with the flow through the intake port being controlled by a port throttle having a sliding plate mounted normally to the longitudinal axes of the intake ports and having windows which may be selectively indexed with the intake ports so as to direct charge air either symmetrically or asymmetrically into the cylinders.

5 Claims, 1 Drawing Sheet

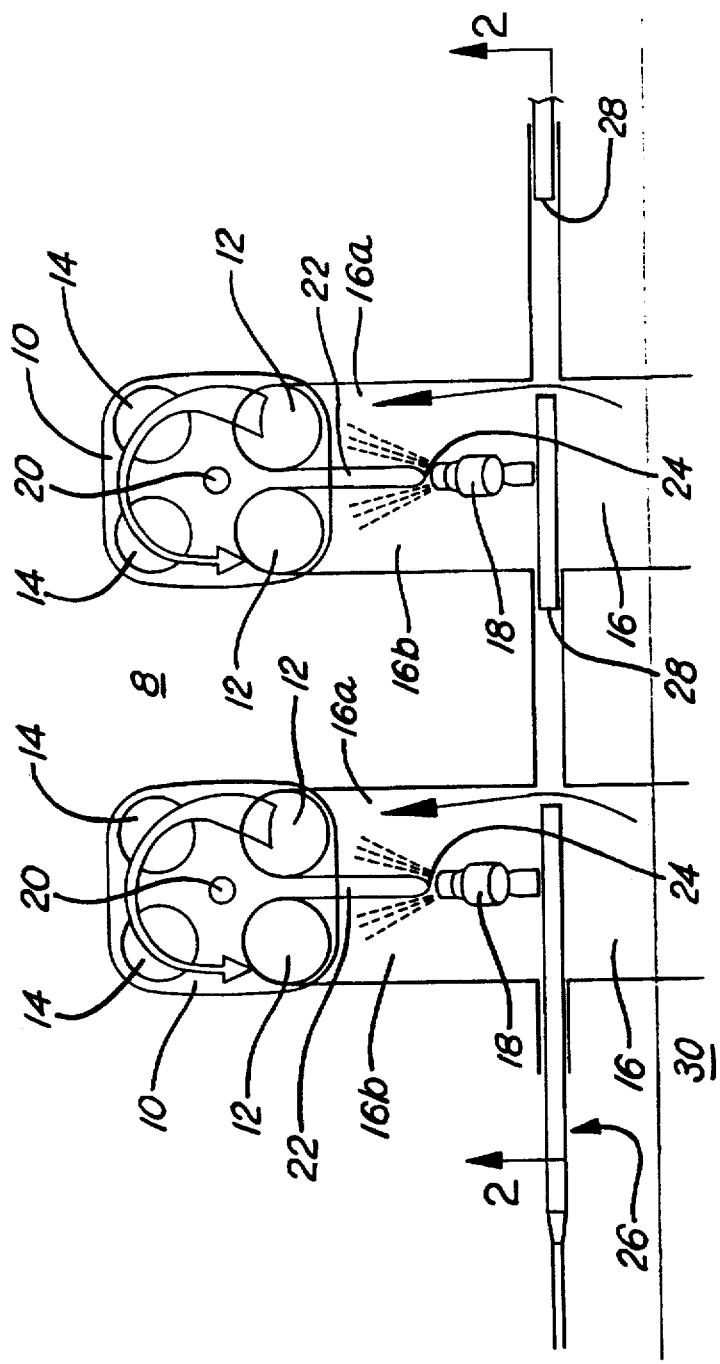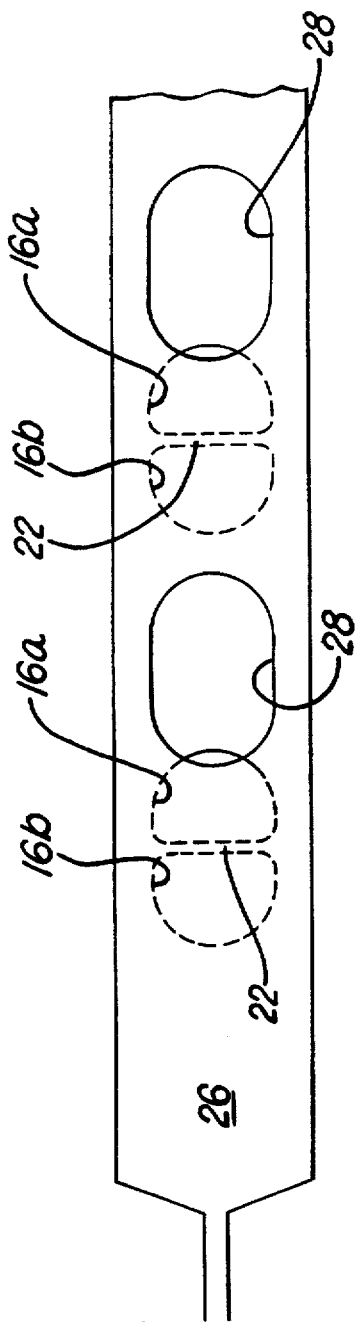

INTERNAL COMBUSTION ENGINE HAVING INTAKE PORT THROTTLES INCORPORATING CHARGE MOTION CONTROL

BACKGROUND OF THE INVENTION

1. Technical Field

The present invention relates to an air throttle system for controlling not only the load output, but also the charge air motion and burn rate of a reciprocating internal combustion engine.

2. Description of Prior Art

In the interest of improving engine performance at high engine speeds, designers often increase, or at least desire to increase, the overlap between intake and exhaust valve events. Unfortunately, this may have the effect of degrading combustion stability at idle and light loads because of increased exhaust residual in the engine cylinders. It is known, however, that if the combustion or burn rate is increased, the stability of the combustion at idle will be enhanced, as will the engine's tolerance to exhaust gas recirculation (EGR). Although it is possible to increase burn rate through fixed turbulence devices, such as masked intake valves, this masking or, for that matter, other fixed flow control devices, will decrease the volumetric efficiency of the engine. And, the engine may become excessively noisy or vibration prone at heavy, load, if the burn rate is so great so as to cause an undesirably rapid pressure rise in the combustion chambers. This is sometimes referred to as combustion harshness.

Another problem suffered with some engines is excessive time lag between changes in throttle opening and the engine's torque response. It seems that time response problems arise where a large manifold volume, which may be desirable from the standpoint of allowing tuning of the induction system, must be filled and emptied of air whenever the throttle position is changed.

Problems related to excessive manifold volume and combustion instability at light loads have been solved in prior art engines through the use of individual cylinder port throttles using conventional butterfly valves. Such valves have been employed only for load control; they have not been employed to control charge motion. And, although such valves work well when properly designed and adjusted, such valves have not been used in many high volume production engines because it is difficult to balance airflow between the valves, and such valves are prone to sludging and cause perturbations in airflow.

Port throttles according to the present invention solve the problems associated with prior art throttling devices, while providing the additional benefit of controlling airflow so as to achieve not only load control but also charge motion control, and, as a result, control of the burn rate, which is sometimes termed the combustion rate.

SUMMARY OF THE INVENTION

A multicylinder internal combustion engine includes a plurality of cylinders, with each cylinder having at least one intake valve and one exhaust valve. At least one intake port supplies charge to each cylinder. A fuel injector mounted within each intake port feeds fuel to each cylinder. A dividing wall extends upstream axially along the port from the position at which the port joins the cylinder through a port volume which is not greater than approximately 70% of the displaced volume of the cylinder.

A port throttle for controlling the magnitude and the direction of airflow through each of the intake ports includes a single sliding plate for each bank of cylinders, with said plate being mounted normally to the longitudinal axes of the intakes ports and having a plurality of windows, which may be selectively indexed with the intake ports such that charge air admitted into the cylinders may be preferentially directed to one side of the dividing wall. Each of the windows allows the passage of air to a single cylinder. In general, the windows have a configuration which matches the sectional configuration of the ports being controlled. The openings in the sliding plate and the ports may be machined together, with the sliding plate being fixtured in the full open position during the machining process so as to allow precision alignment of the slider openings and the port openings.

The sliding throttle plate may be employed within a separate spacer assembly located between the cylinder head and the intake manifold, or may be integral with either the intake manifold or the cylinder head. The port throttles of the present invention may be employed with either single or multiple intake valves, such as two or even three intake valves. In any case, the windows within the port throttles' sliding plate are only partially indexed with the intake ports during part throttle operation of the engine, at which time the combustion occurs at a rapid rate, due to the favorable charge motion induced in the cylinders by the sliding plate. The windows are fully indexed at the intake ports at full throttle operation, at which time the combustion occurs at a slower rate.

According to another aspect of the present invention, a method for controlling combustion rate and output torque of an internal combustion engine having at least one cylinder includes the steps of determining an appropriate throttle opening based on sensed values of a plurality of engine operating parameters, and opening a sliding air charge throttle located in an intake port upstream of an intake valve by an amount sufficient to not only supply the mass of air required for the cylinder, but also to selectively direct air to enter the cylinder either symmetrically or asymmetrically.

BRIEF DESCRIPTION OF THE DRAWINGS

FIG. 1 is a schematic representation of an internal combustion engine having intake port throttles according to the present invention.

FIG. 2 is a side elevation of a sliding plate throttle element according to the present invention, taken along the line 2—2 of FIG. 1.

DESCRIPTION OF PREFERRED EMBODIMENTS

In FIG. 1, an engine having cylinder head 8 is illustrated as having two cylinders. Those skilled in the art will appreciate, in view of this disclosure, that a port throttle system incorporating charge motion control according to the present invention could be employed with multicylinder engines having either in-line, V, or other configurations.

Cylinder head 8, for each of cylinders 10, includes two intake valves 12 and two exhaust valves 14. The present invention could, however, be used with a single intake valve and single or multiple exhaust valves. If a single intake valve were employed with an engine, according to the present invention, it would preferably be positioned such that a dividing wall, which will be described later in this specification, extends along the intake port to almost the center of the intake valve. A cylinder arrangement according to the present invention further includes intake ports 16 for supplying charge to each cylinder, and fuel injectors 18 with one injector being associated with each cylinder. Fuel injector 18 has a divided spray which sprays through window 24 in dividing wall 22. The divided spray feature of injector 18 allows the injector to discharge fuel on both sides of dividing wall 22 without undue wetting of the passages of intake ports 16.

Dividing wall 22 extends upstream, axially along port 16 from the position at which port 16 joins cylinder 10 through a volume of port 16, which is not greater than approximately 70% of the displacement volume of cylinder 10.

A port throttle according to the present invention has a primary element comprising slider 26 which is located, as shown in FIG. 1, within cylinder head 8. Those skilled in the art will appreciate in view of this disclosure, however, that slider 26 could be located within a spacer sandwiched between cylinder head 8 and intake manifold 30, or it could be located entirely within intake manifold 30, were ports 16 to be made sufficiently short so as not to induce too much dead volume between sliding plate 26 and cylinders 10.

FIG. 2 illustrates further details of construction of sliding plate 26 and intake port 16. For each cylinder serviced by intake manifold 30, sliding plate 26 has a window 28 having a cross-sectional configuration which is matched with port 16. Notice from the Figures that port 16 is divided into primary section 16a and secondary section 16b. Because windows 28 are matched closely with port 16, the wide-open throttle operating condition with the present invention is characterized by an absence of any restriction of airflow which would normally be caused by the presence of a throttle shaft and plate within the charge air stream.

FIG. 1 illustrates sliding plate 26 in an idle or part throttle position. When windows 28 are indexed with intake port 16 in this part throttle position, charge air is preferentially directed to primary section 16a of port 16. This asymmetrical direction of charge air into cylinders 10 causes high swirl within the combustion chamber, improving EGR tolerance and combustion stability during low load operating conditions. The small overlap or idle flow position of windows 28 and intake port 16 is also shown in FIG. 2.

When windows 28 are fully indexed with intake ports 16, i.e., when the engine is at full throttle operation, combustion will occur at a slower rate. This is beneficial because the slower rate will help to avoid combustion harshness.

While the invention has been shown and described in its preferred embodiments, it will be clear to those skilled in the arts to which it pertains that many changes and modifications may be made thereto without departing from the scope of the invention.

What is claimed is:

1. A multicylinder internal combustion engine comprising:

a plurality of cylinders, with each cylinder having at least one intake valve and one exhaust valve;

a plurality of intake ports located within a cylinder head, with at least one port for supplying charge to each cylinder;

a fuel injector mounted within each intake port;

a dividing wall extending upstream axially, from the position at which each intake port joins a cylinder, through a volume of the intake port which is not greater than approximately 70% of the displacement volume of the cylinder; and a port throttle for controlling the magnitude and direction of airflow through each of said intake ports, with said port throttle comprising a single sliding plate extending through the intake ports normally to the longitudinal axes of said intake ports and having a plurality of windows which may be selectively indexed with said intake ports such that charge air admitted into said cylinders may be directed to the primary section of the port during low load, high swirl operation, whereas air may be directed equally to both sections of the port during high load, low swirl operation.

2. An engine according to claim 1, wherein each of said windows has a configuration which matches the sectional configuration of the port being controlled, such that said throttle does not impede the flow of air into the cylinder during full throttle operation.

3. An engine according to claim 1, wherein each of said cylinders has two intake valves with one of said valves being located on each side of said dividing wall.

4. An engine according to claim 1, wherein each of said cylinders has a single intake valve with said dividing wall extending at its inner end to the centerline of the valve, and with said port throttle and said dividing wall preferentially directing charge air tangentially into the cylinder during part throttle operation of the engine.

5. An engine according to claim 1, wherein said fuel injector is mounted within said intake port so as to discharge fuel spray through a window in said dividing wall and into both sides of said port.

\* \* \* \* \*